UNITED STATES PATENT OFFICE 2,903,331
Patented Sept. 8, 1959

2,903,331

URANIUM SOLVENT EXTRACTION PROCESS

Charles D. Harrington, Normandy, Mo., assignor to the United States of America as represented by the United States Atomic Energy Commission No Drawing. Application November 8, 1949
Serial No. 126,249

3 Claims. (Cl. 23—14.5)

This invention relates to a solvent extraction process for the recovery of uranium and more especially pertains to a purification process for uranyl nitrate.

Uranium-containing ores and ore concentrates have been treated for uranium metal values recovery by nitric acid dissolution. Uranyl nitrate solutions were obtained which also contained impurities originally associated in the ore with uranium.

Pitchblende ore has the following typical analysis:

|  | Percent |
|---|---|
| $U_3O_8$ | 50–65 |
| $SiO_2$ | 16–21 |
| PbO | 5–6.5 |
| $Fe_2O_3$ | 0.25–0.50 |
| $MoO_3$ | 0.5–0.8 |
| NiO | 0.5–2.2 |
| $Al_2O_3$ | About 0.6 |
| CaO | 0.4–1.0 |
| MgO | About 2.2 |
| CuO | 0.10–0.35 |
| Co | About 0.17 |
| $MnO_2$ | 0.02–0.05 |
| $V_2O_3$ | About 0.06 |
| $TiO_2$ | About 0.06 |
| BaO | About 0.06 |
| Rare earths | About 0.16 |
| $CO_2$ | About 1.5 |
| $SO_3$ | About 0.45 |
| $P_2O_5$ | About 1.11 |

When pitchblende is treated with nitric acid, the iron, molybdenum, lead, and vanadium values, for example, are dissolved along with the uranium values as their nitrates. It has been found desirable to use a mixture of nitric acid and sulfuric acid for maximum recovery of uranium values from pitchblende ore. This mixture of acids serves another purpose. It desirably decreases the amount of lead values dissolved since insoluble lead sulfate is formed. The decrease in dissolution of lead also serves to maintain the radium values in the residue. However, sulfuric acid is undesirable in a diethyl ether extraction of uranyl nitrate from an aqueous solution. It lowers the distribution coefficient of uranyl nitrate between ether and aqueous solution. It has been found possible to reduce the free sulfuric acid content of the aqueous solution resulting from the pitchblende dissolution step by adding a barium salt, such as barium carbonate, to the aqueous solution. Sulfate anions are removed as a barium sulfate precipitate. The uranyl nitrate aqueous solution from the foregoing treatment contains small amounts of lead nitrate and barium nitrate, the latter being produced when barium carbonate is used by reaction with nitric acid. Of course, barium nitrate may be used instead of barium carbonate for sulfate removal. For an ether extraction of uranyl nitrate to purify it, the aqueous solution is then provided with a salting-out agent, such as alkali nitrates and alkaline earth nitrates, to increase the distribution coefficient of uranyl nitrate between ether and aqueous phase.

In the recovery of uranium values from ores or ore treatment residues containing uranium, at least partially as uranyl phosphate, $UO_2HPO_4$, it has been found that a high degree of dissolution of uranium values can be obtained provided the amount of nitric acid used is sufficient to maintain a free nitric acid concentration of at least 3 N and preferably at least 5 N. To purify the uranium it is desirable to diethyl ether extract the resultant uranyl nitrate from the aqueous solution. Prior to ether extraction the acidity is reduced and a salting-out agent is provided in the aqueous solution. Part of the salting-out agent is provided by adding an alkali hydroxide or alkaline earth hydroxide to reduce the nitric acid concentration. To prevent loss of uranium values as a precipitate from the uranyl nitrate solution either before or during the ether extraction, it is necessary to maintain the acidity of the aqueous solution sufficiently high to prevent the precipitation of uranyl phosphate. The amount of free nitric acid for the aqueous solution depends upon the concentration of phosphate anion in the aqueous solution. For example, when the ore treatment residue used contains more than 8% phosphate content, the free nitric acid concentration of the final solution should be above 2 N when the uranyl nitrate concentration is about 250 g. of uranium per liter of the solution.

When the foregoing uranyl nitrate aqueous solutions containing a salting-out agent are subjected to an extraction of uranyl nitrate using a neutral organic solvent, such as neutral diethyl ether, in a continuous extraction process, the organic solvent extracts nitric acid as well as uranyl nitrate thereby reducing the acidity of the aqueous solution. As a result, precipitates, such as lead and barium hydroxy nitrates, form in the case of uranyl nitrate solution obtained from pitchblende ore. In the case of the aqueous solution obtained by the treatment of uranyl phosphate-containing ores or residues, the precipitate is uranyl phosphate. In both instances, the precipitate causes difficulties in a continuous countercurrent ether extraction by the formation of emulsions and by clogging of the free space in a packed column of a continuous countercurrent extractor.

In the separation of uranyl nitrate from an acidic aqueous solution using neutral ether, there is a large amount of heat produced by the transfer of uranyl nitrate and nitric acid from the aqueous phase to the ether phase. Accordingly, it is necessary to provide the continuous extractor with a cooling coil in order to prevent ether from boiling at the top of the extraction column. The heat produced increases the tendency towards emulsification of the two phases. It would be possible, perhaps, to provide sufficient nitric acid in the aqueous solution so that after contacting with neutral ether, the amount of nitric acid remaining in the aqueous phase would be sufficient to prevent the hydrolysis of hydrolyzable metal nitrates or the formation of uranyl phosphate precipitate. However, such a large concentration of nitric acid would increase considerably the heat due to transfer of chemicals from the aqueous phase to the ether phase and cause serious emulsion difficulties.

It is an object of this invention to provide an ether extraction of uranyl nitrate from an aqueous solution containing free nitric acid without substantial reduction of the nitric acid concentration.

It is another object of the present invention to provide a continuous solvent extraction process without emulsion difficulties.

It is still a further object of this invention to provide a process for the diethyl ether extraction of uranyl nitrate from an aqueous solution containing free nitric acid without the formation of a precipitate from said aqueous solution.

Other objects will be apparent from the description which follows.

I have found that the continuous ether extraction of uranyl nitrate from an aqueous solution containing uranyl nitrate, a salting-out agent, nitric acid, and a material precipitative in the absence of said nitric acid, e.g., a hydrolyzable metal nitrate and phosphoric acid, can be accomplished satisfactorily by using diethyl ether containing nitric acid in a concentration sufficient to maintain a sufficient nitric acid concentration in the aqueous solution to prevent precipitation. Ether containing 0.5 to 1.5 N nitric acid is suitable. The use of acidulated ether prevents the transfer of nitric acid from the aqueous solution thereby substantially reducing the heating of the ether during the contacting for extraction. By the use of acidulated ether the acidity of the aqueous solution is maintained in at least a sufficient concentration to prevent precipitation of uranyl phosphate and hydrolyzable metal nitrates, such as barium nitrate and lead nitrate, when present. By the use of acidulated ether emulsion difficulties are avoided in the continuous countercurrent extraction of uranyl nitrate. Furthermore, the extraction is carried out without formation of a hydroxy nitrate precipitate which would clog the free space of the packed extraction column.

The nitric acid concentration in the ether is provided by adding concentrated nitric acid, such as commercial 70% nitric acid, in a suitable amount to diethyl ether.

The following description of a pilot plant experiment illustrates the process of the present invention in which uranyl nitrate is extracted from such aqueous solutions without the formation of undesirable precipitates and without the formation of emulsions.

A quantity of pitchblende ore was dissolved in a stoichiometric excess of a strong (38° Baumé) nitric acid containing sufficient amount of sulfuric acid to precipitate most of the lead present in the ore. After a digestion period the slurry was filtered. The cake contained silica present in the ore as well as lead sulfate and radium values co-precipitated with the lead sulfate as radium sulfate. Barium carbonate was added to the filtered acid solution containing uranyl nitrate to remove sulfuric acid as barium sulfate. After removing the barium sulfate precipitate by filtration, the resultant filtrate was boiled until a boiling point of 118° C. was reached and then the liquor was diluted. Calcium nitrate tetrahydrate was added as salting-out agent and the nitric acid concentration was adjusted. The final solution contained 200 g. of calcium nitrate per liter, 0.5 N free nitric acid, and 2.3 lb. of uranium as uranyl nitrate per gal. of solution. This solution constituted the feed solution to an extraction column, which was a 4-in. diameter glass column packed with 0.75-in. thin-walled porcelain Raschig rings in a section 20 ft. long. The extraction column had free spaces above and below the packed section. The feed solution of uranyl nitrate was introduced in the top section of the column and diethyl ether containing 1 N nitric acid was introduced in the bottom section of the column.

The mixing of the aqueous feed solution and the acidulated ether with the resultant extraction of uranyl nitrate by the ether phase liberated enough heat to normally cause the ether to boil at the top of the column. The ether boiling was eliminated by providing as an upper section of the column a 4-in. diameter stainless steel pipe 3 ft. long having a cooling jacket and a cooling coil inside the pipe. Water was circulated through the jacket and coil to reduce the temperature of this section sufficiently to eliminate ether boiling. A flow control valve was provided in the raffinate effluent line to maintain the interphase level between the aqueous raffinate and the acidulated ether extract phase in the bottom section of the column.

The ratio of acidulated ether to feed solution was 2 to 1. The total throughput was 96 gal./hr. The total throughput was defined as the total volume of liquids passing through the extraction column in both directions. The efficiency of uranyl nitrate extraction was 99.6%. An extraction efficiency of 99.8% was obtained at total throughputs of 64 and 32 gal./hr.

The ether extract phase from the extraction column was introduced into the bottom section of a 4-in. diameter glass column 11 ft. long. Water was introduced in the top section of this wash column through a jet that provided a fine dispersion of water particles. The particles remained dispersed throughout their fall through the ether phase to the bottom of the column. The volume flow rate of water was 10% of the volume flow rate of the ether extract phase. The water phase removed from the bottom of this column contained a substantial portion of the impurities originally extracted by the ether and about 25% of the uranyl nitrate. To recover the uranium values therefrom this aqueous phase was introduced in the top section of the extraction column along with the feed solution. The ether phase from this second column was transferred continuously to the bottom section of a third 4-in. diameter column 9 ft. long. This re-extraction column was provided in the top section with a water spray jet system consisting of five jets. Water was introduced by means of the jets to provide a volume rate equal to about one-half the rate of ether. All of the uranyl nitrate was extracted from the ether phase. The aqueous extract phase was withdrawn from the bottom of the column.

A considerable number of experiments were carried out in the pilot plant according to the foregoing procedure with nitric acid solutions of uranyl nitrate from pitchblende ore in which the uranium concentration varied from 1.9 to 2.6 lb. of uranium per gal. of solution with an average concentration of 2.2 lb. of uranium per gal. The average free nitric acid was 0.6 N. The acidulated ether contained 1 N nitric acid. In Table I below the purification obtained by the ether extraction is illustrated by the reduction in the concentration of four impurities.

*Table I*

| | Average concentration [1] in p.p.m. of— | | | |
|---|---|---|---|---|
| | MoO$_3$ | P$_2$O$_5$ | SiO$_2$ | Fe |
| Aqueous feed soln | 3,900 | 1,900 | 360 | 5,000 |
| Aqueous extract from re-extraction column | 970 | 350 | 31 | 21 |

[1] Based upon uranium.

In these continuous countercurrent extraction experiments, the extraction operated very satisfactorily without emulsion difficulties or precipitation of undesirable materials.

The foregoing illustration is not intended as a limitation of the process of the present invention which is to be limited entirely by the following claims.

What is claimed is:

1. In a process for the recovery of uranium values from pitchblende ores containing phosphate anions in which the pitchblende ore is dissolved in nitric acid of sufficient concentration to prevent precipitation of uranyl phosphate, a sufficient amount of sulfuric acid to precipitate most of the lead present in the ore, the slurry is filtered, barium carbonate is added to the filtered acid solution to remove sulfuric acid as barium sulfate, the barium sulfate is filtered from the solution, calcium nitrate tetrahydrate and nitric acid are added, and the uranyl nitrate solution is extracted with diethyl ether, the improvement wherein nitric acid is added to the diethyl ether to make it 1 N in nitric acid.

2. In a process for the recovery of uranium values from pitchblende ores containing phosphate anions in which the pitchblende ore is dissolved in nitric acid of sufficient concentration to prevent precipitation of uranyl phosphate, a sufficient amount of sulfuric acid to precpitate most of the lead present in the ore, the slurry is filtered, barium carbonate is added to the filtered acid solution to remove sulfuric acid as barium sulfate, the barium sulfate is filtered from the solution, calcium nitrate tetrahydrate and nitric acid are added, and the uranyl nitrate solution is extracted with diethyl ether, the improvement wherein niric acid is added to the diethyl ether to make it 0.5–1.5 N in nitric acid.

3. The improvement of claim 2 in the process of claim 2 wherein the free nitric acid concentration in the solution is about 2 M.

References Cited in the file of this patent

UNITED STATES PATENTS

| | | |
|---|---|---|
| 2,227,833 | Hixson et al. | Jan. 7, 1941 |
| 2,780,532 | Hainer et al. | Feb. 5, 1957 |
| 2,816,005 | Furman et al. | Dec. 10, 1957 |
| 2,838,367 | Clark et al. | June 10, 1958 |
| 2,839,357 | Clark et al. | June 17, 1958 |

OTHER REFERENCES

Mellor: "Inorganic and Theoretical Chemistry," vol. 12, p. 131 (1932); publ. by Longmans, Green & Co., London.

Bachelet: "Chemical Abstracts," vol. 42, p. 7136 (1948).